United States Patent [19]
Locke et al.

[11] Patent Number: 5,743,290
[45] Date of Patent: Apr. 28, 1998

[54] MULTI-PURPOSE AUTOMATIC FILLING AND LEVELING LIQUID BASIN WITH LIQUID TRANSFER

[76] Inventors: Randal D. Locke; Daniel P. Dunbar; Teresa M. Locke, all of P.O. Box 1325, Redway, Calif. 95560-1325

[21] Appl. No.: 767,837

[22] Filed: Dec. 17, 1996

Related U.S. Application Data

[63] Continuation-in-part of Ser. No. 479,712, Jun. 7, 1995, and a continuation-in-part of Ser. No. 488,289, Jun. 7, 1995, and a continuation-in-part of Ser. No. 488,292, Jun. 7, 1995, and a continuaiton-in-part of PCT/US96/10493, Jun. 7, 1996.

[51] Int. Cl.[6] ............... F16K 31/128; F16K 31/385
[52] U.S. Cl. ................... 137/403; 137/414; 137/426
[58] Field of Search ..................... 137/403, 414, 137/426

[56] References Cited

U.S. PATENT DOCUMENTS

| | | | |
|---|---|---|---|
| 3,895,645 | 7/1975 | Johnson | 137/414 |
| 4,065,095 | 12/1977 | Johnson | 137/414 |
| 4,180,096 | 12/1979 | Johnson | 137/414 |
| 4,574,826 | 3/1986 | Johnson | 137/414 |
| 4,945,944 | 8/1990 | Chen | 137/414 |
| 5,255,703 | 10/1993 | Johnson | 137/414 |
| 5,358,003 | 10/1994 | Langill | 137/414 |

Primary Examiner—George L. Walton
Attorney, Agent, or Firm—Millen, White, Zelano, & Branigan, P.C.

[57] ABSTRACT

A device for dispensing water front a source of water under pressure to at least one water using attachment, includes a basin and a water dispensing adjustable diaphragm fill valve. The water using attachments may have various configurations such as but not limited to garden planters and pots, terrariums, ant farms, garden pot converters, underground springs, Christmas tree stands, animal waterers, animal waterer/feeders, bird baths, hummingbird feeders, amphibian habitats, animal cages, bird cages, pond filter/fountains, aquariums, air conditioners and water toys. The basin holds a volume of water and has a closed bottom, at least one side wall, and an open top and includes a water inlet port adapted to connect the basin to the source of water under pressure. A mounting rim is positioned adjacent to the open top for mounting the water using attachments, and a seat is provided for readily accepting and releasing the fill valve within the basin below a selected water line. The adjustable diaphragm fill valve is mounted on the seat and maintains a volume of water in the basin at a predetermined level. The fill valve has at least one water outlet port for dispensing water from the fill valve into the basin.

2 Claims, 4 Drawing Sheets

5,743,290

MULTI-PURPOSE AUTOMATIC FILLING AND LEVELING LIQUID BASIN WITH LIQUID TRANSFER

RELATED APPLICATIONS

This application is a continuation-in-part of U.S. patent applications Ser. Nos.; 08/479,712, 08/488,289 and 08/488, 292, all filed on Jun. 7, 1995, and PCT application Ser. No. US96/10493, filed Jun. 7, 1996 whose disclosures are incorporated herein by reference.

FIELD OF THE INVENTION

The present invention relates to a multi-purpose, automatic liquid filling and liquid level regulating device. More particularly, it relates to such a device which supplies liquid continuously from a source thereof under pressure to a liquid using attachment which is adapted for use in conjunction therewith, at a rate responsive to the rate of use by the liquid using attachment, and to novel valves used therewith.

BACKGROUND ART

In the preferred embodiment, the present invention incorporates a number of improvements to a liquid diaphragm fill valve used for toilets, described in U.S. Pat. Nos. 4,240,606, 4,180,096, 4,065,095 and 3,895,645 whose disclosures are incorporated herein by reference.

A reliably repeatable self-leveling liquid valve, that is also compact, inexpensive to manufacture, easy to repair or replace and impervious to typical environmental forces, is needed for so-called "self watering" or "automatic" growing containers for plants as well as numerous other devices. There have been numerous attempts to make truly "automatic" garden pots as well as many of the devices listed hereinafter. As an example, the following eighteen patents describe some form of self watering or purportedly automatic growing container for plants:

Pat. No. 3,733,746 Allen Jr. May 22, 1973 Self Feeding Flower Pot
Pat. No. 3,758,987 Crane Jr. Sep. 18, 1973 Automatic Plant Watering Device
Pat. No. 3,775,904 Peters Dec. 04, 1973 Self-Watering Flower Pot
Pat. No. 3,783,555 Peters Jan 08, 1974 Self-Watering Flower Pot
Pat. No. 3,871,131 Berglund Mar. 18, 1975 Self-Watering Plant Pots or Receptacles
Pat. No. 3,903,644 Swift Sep. 09, 1975 Self-Watering Planter and Method of Making Same
Pat. No. 4,052,818 Hagerty Oct. 11, 1977 Method and Apparatus for Containerizing Plants with a Self-Watering System
Pat. No. 4,148,155 Allen Apr. 10, 1979 System and Apparatus for Automatically Feeding Plants
Pat. No. 4,183,175 Magee Jan 15, 1980 Self-Watering Apparatus for Growing Plants
Pat. No. 4,198,784 Sukes Apr. 22, 1980 Vessel for Supporting and Automatically Providing Liquid to Vegetation
Pat. No. 4,324,070 Swister Apr. 13, 1982 Self-Watering Planter
Pat. No. 4,329,815 Secrest May 18, 1982 Self Controlled Watering Planter Device
Pat. No. 4,344,251 Edlung Aug. 17, 1982 Self-Irrigating Pot for Plants
Pat. No. 4,356,665 de Oliveos Nov. 2, 1982 Self-Watering Planter
Pat. No. 4,527,354 Sellen Jul. 09, 1985 Implantable Reservoir for Automatic Watering
Pat. No. 5,020,261 Lishman Jun. 4, 1991 Moisture Sensitive Self-Watering Planter
Pat. No. 5,341,596 Kao Aug. 30, 1994 Automatic Water Supply Device for Potted Plants In fact, these containers are neither self-watering nor automatic because they all require human refilling of the reservoir.

Three issued patents that are true automatic plant pots are:
Pat. No. 4,083,147 Garack Apr. 11, 1978 Automated Planter Box System
Pat. No. 4,546,571 Scrivens Oct. 15, 1985 Plant Watering Apparatus
Pat. No. 4,557,071 Fah Dec. 10, 1985 Automatic Watering and Feeding System for Plants The plant waterers of the last three patents, although automatic, suffer from one or more deficiencies including cumbersome and complex valving arrangements which are prone to failures. These three are merely exemplary of the need for a self-filling and self-leveling liquid basin and associated filling valve which can perform at a reasonable cost and in a reliable manner the functions attempted by the inventions listed above. A feature of this invention not seen in the known prior art, is its ability to perform a number of different functions and cooperate with various other structures which are not limited to garden planters and pots, terrariums, ant farms, garden pot converters, underground springs, Christmas tree stands, animal waterers, animal waterer/feeders, bird baths, bird houses, hummingbird feeders, amphibian habitats, animal cages, bird cages, pond filters and fountains, aquariums, air conditioners, water toys and portable filling valves.

SUMMARY OF THE INVENTION

In one aspect, this invention relates to a multipurpose automatic filling and liquid level regulating device for dispensing liquid from a source thereof which is under pressure to a liquid using attachment when the latter is mounted thereon, comprising: a liquid holding basin adapted as a reservoir for a volume of liquid to be dispensed therefrom to a liquid using attachment mounted on the basin and which has a closed bottom, at least one side wall and an open top and which comprises: a liquid inlet adapted to connect the basin to the source of liquid under pressure; seating means in the interior of the basin for detachably mounting a fill valve in the basin below a predetermined liquid level line between the top and the bottom of the basin, which leaves air space above the top of the liquid when the basin is filled to the selected liquid level line with a volume of liquid; and a mounting rim adjacent the open top adapted to mount the liquid using attachment on the open top of the basin; and mounting means for mounting a liquid using attachment on the open top of the basin; and an adjustable diaphragm fill valve for maintaining the volume of liquid in the basin at a selected liquid level line, which valve comprises: means for detachably mounting the valve onto the seating means below the selected liquid level line; and interior cavity with a lower portion in liquid communication with the source thereof under pressure and an upper portion in liquid communication with the interior of the basin, which lower and upper portions are separated by; a diaphragm which reciprocally closes the valve, in response to the weight of liquid in the basin above the diaphragm when the liquid is at the selected liquid level, and opens the valve in response to a drop in the level of the liquid in the basin below the selected liquid level; a liquid inlet port providing liquid communication with the liquid inlet of the basin and the lower portion of the valve cavity; a liquid outlet port providing liquid communication between the upper portion of the valve cavity and the interior of the basin for dispensing liquid from the fill valve into the basin when the valve is in its open position; and a gas port which provides gas communication between the upper portion of the valve cavity and the interior of the basin for maintaining the diaphragm of the fill valve at ambient pressure.

In a preferred embodiment the basin includes a liquid inlet port adapted to connect the basin to the source of liquid under pressure; a mounting rim adjacent the open top adapted to mount the liquid using attachment, a seat for mounting the fill valve to an inner surface of the basin below a selected liquid line when the basin is filled with the volume of liquid; and an integral snorkle device for porting ambient gas to the valve. The liquid dispensing fill valve includes a diaphragm and is detachably mounted in the basin for maintaining a volume of liquid within the basin at a predetermined level. The diaphragm valve comprises an interior cavity with a lower portion in liquid communication with the source thereof under pressure and an upper portion in valved liquid communication with the interior of the basin. A second cavity houses a diaphragm which is supported between the upper and lower portions of the valve and connected to a rigid lever that moves in response to the pressure of liquid on the upper surface of the diaphragm thereby activating the valve to close when the desired liquid level is reached and to open when the liquid level drops below the desired level. Ambient air is ported through a open ended sealed conduit molded into a utility bracket that is fused to the bottom face of the floor of the basin, through that conduit to the underside of the second cavity housing the diaphragm of the valve and allowing the diaphragm to instantly adjust to barometric pressure changes which would otherwise change the pressure on the diaphragm and thereby the selected liquid fill level.

In another aspect, the present invention accepts an adjustable reservoir fill valve adapted for communication by conduit with a separate water reservoir displaced above the valve, which valve comprises: a reservoir valve crown held in liquid tight combination with the reservoir valve cover by three screws; an interior cavity with a lower portion adapted for liquid communication with a source thereof under pressure and an upper portion adapted for liquid communication with the reservoir; a second interior cavity which houses a diaphragm which reciprocally closes the valve, in response to the weight of liquid in the reservoir above the diaphragm when the liquid is at the selected liquid level, and opens the valve in response to a drop in the level of the liquid in the reservoir below the selected liquid level; a liquid inlet port adapted for liquid communication with liquid inlet of the reservoir and the lower portion of the valve interior cavity; a single liquid outlet port adapted for providing liquid communication between the upper portion of the valve cavity and the elevated reservoir for dispensing liquid from the fill valve into the reservoir when the valve is in its open position; a gas port providing gas communication between the diaphragm cavity and the exterior of the reservoir for maintaining the diaphragm of the fill valve at ambient pressure; a reservoir valve assembly which is sealed with an integral gasket that closes and seals the interior cavity of the valve; a detachable reservoir valve crown that fits in liquid tight communication onto and around the open top the reservoir valve cover, thereby preventing liquid from leaving the valve in any but the single outlet port located on the top of the valve crown, a sealed liquid tight valve adjusting screw that fits through the valve crown and incorporates a sealing gasket around its shank to prevent liquid leakage from the valve, and a sealing gasket to seal the space between the valve crown and the reservoir valve cover.

The reservoir valve when used with the basin of this invention, can function in a nearly identical manner as the diaphragm valve of this invention when used with the outlet nipple removed from the reservoir valve.

In a further aspect, this invention relates to the dispensing basin of this invention in combination with a liquid using attachment adapted for mounting on the top thereof, in contact with liquid in the basin. In another aspect, this invention relates to the dispensing basin of this invention in combination with liquid transfer means, such as a plurality of wicks, for transfering liquid in the basin to the liquid using attachment when mounted thereon.

The liquid using attachments that sit on or attach to the basin attachment seating rim, or connect to the basin or valves by liquid conduits or other means, can have various configurations such as but not limited to; garden planters and pots, terrariums, ant farms, garden pot converters, underground springs, Christmas tree stands, animal waterers, animal waterer/feeders, bird baths, hummingbird feeders, amphibian habitats, animal cages, bird cages, pond filter/fountains, aquariums, air conditioners and water toys.

DESCRIPTION OF THE PREFERRED
EMBODIMENT OF THE INVENTION

The terms "water" or "liquid" when used herein ordinarily mean municipal tap water or well water but also includes aqueous solutions containing one or more of plant or animal nutrients, pesticides, algicides, disinfectants and theraputic agents. Without straying from the scope of the present invention, the valve and the portable valve base can be made of materials resistant to corrosive or solvent liquids and therefore enable the invention to utilize other liquids including but not limited to; photofinishing chemicals, fuels and solvents, plasma, saline solutions, cosmetic and food liquids, fragrances, surfactants, dyes and other liquids at or near the consistency of water.

The Valve

Figure 1:
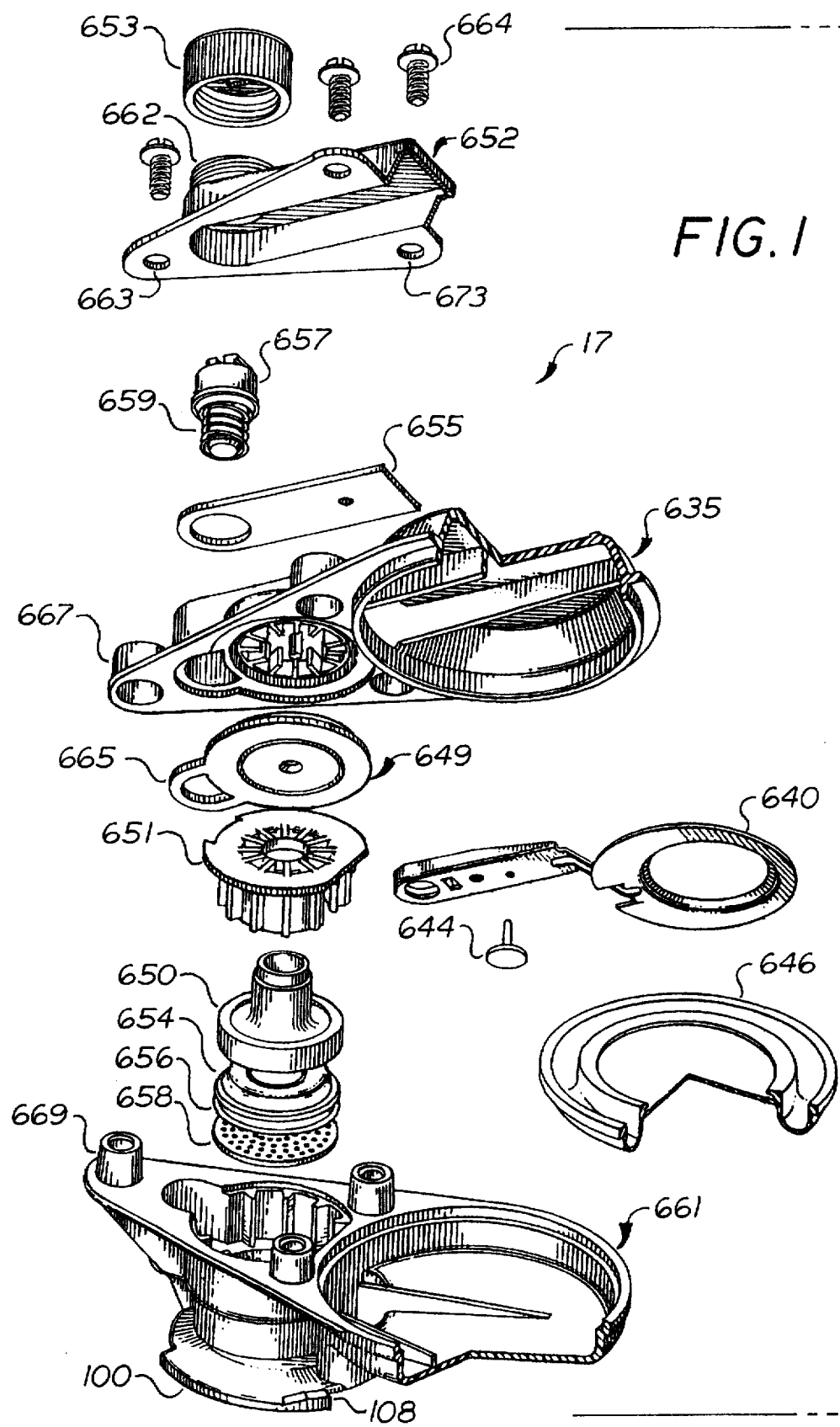
FIG. 1 is a perspective exploded view of a reservoir valve, embodying the features of the present invention, and its adjusting mechanism that fits in the the portable valve base shown in FIG. 1.
Figure 2:
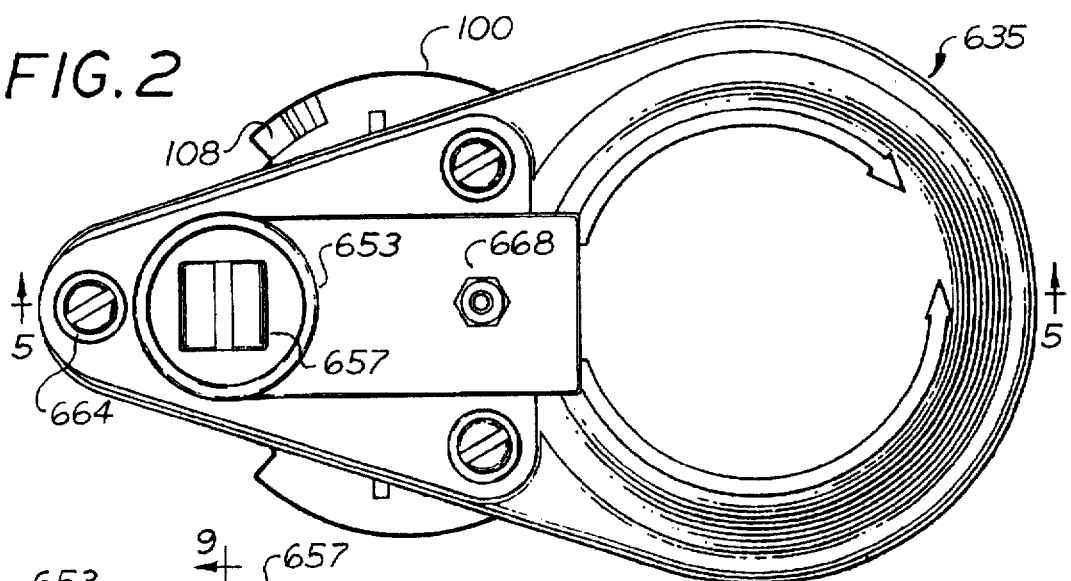
FIG. 2 is a top view on an enlarged scale of the reservoir valve shown in FIG. 1.
Figure 3:
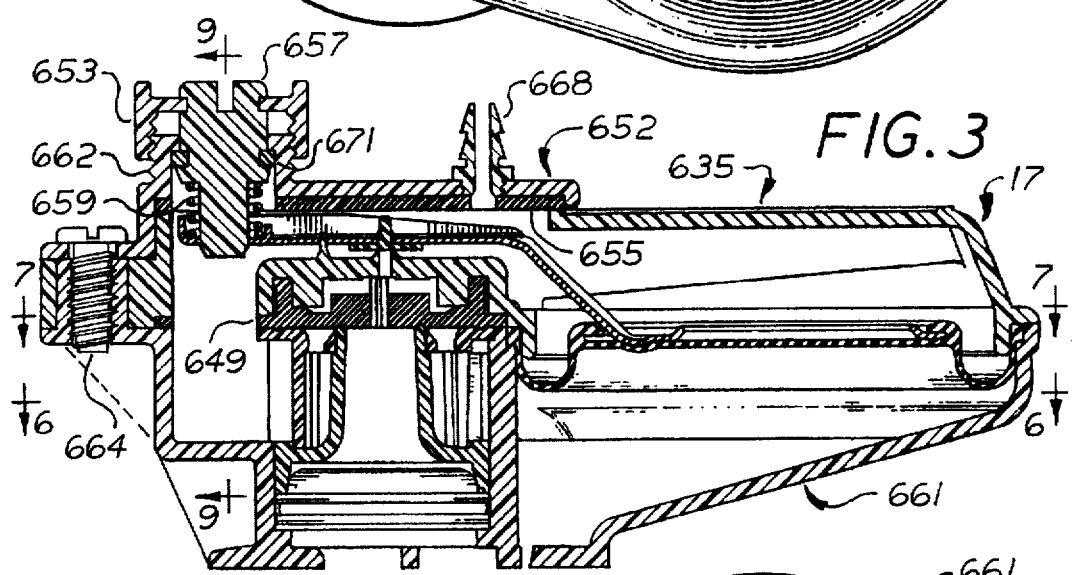
FIG. 3 is a vertical sectional view taken along the line 5—5 of FIG. 2.
Figure 4:
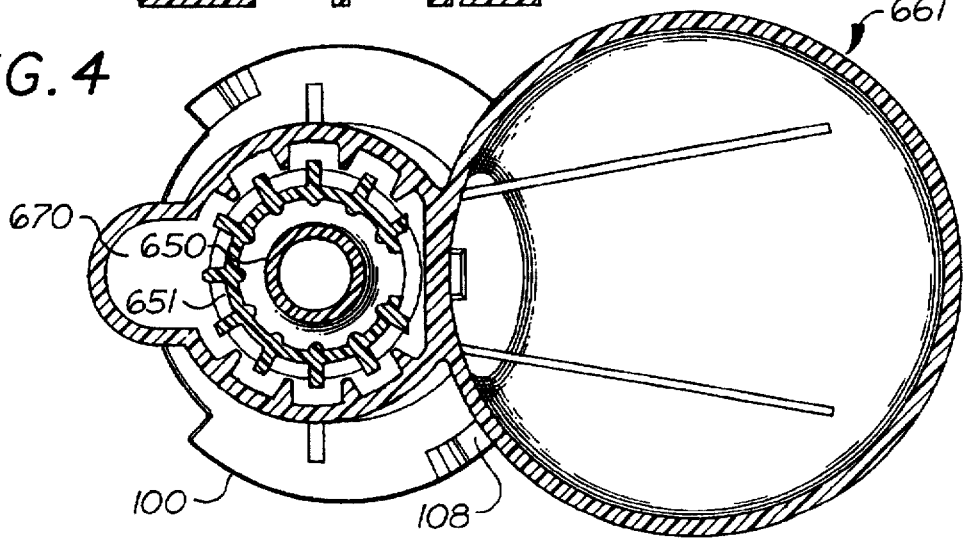
FIG. 4 is a sectional view taken along the line 6—6 of FIG. 3.
Figure 5:
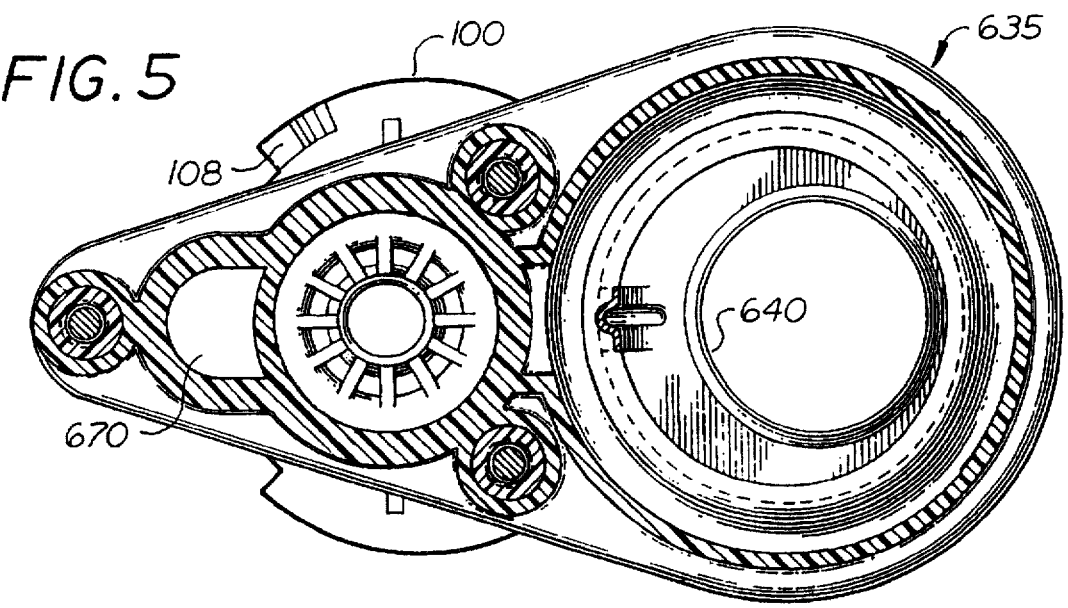
FIG. 5 is a sectional view taken along the line 7—7 of FIG. 3.
Figure 6:
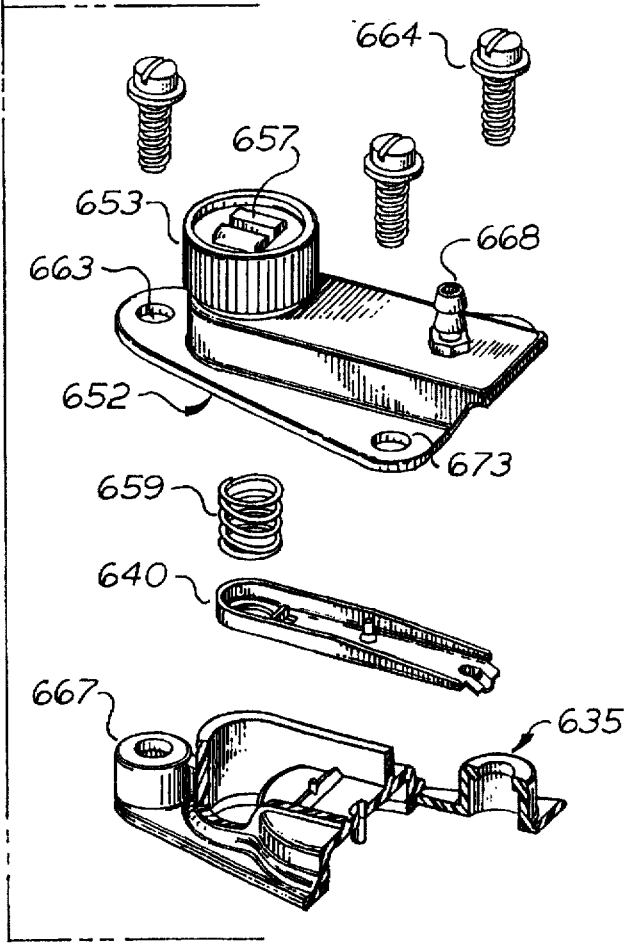
FIG. 6 is a perspective exploded view on an enlarged scale of the reservoir valve crown and its adjusting mechanism shown in FIG. 1.
Figure 7:
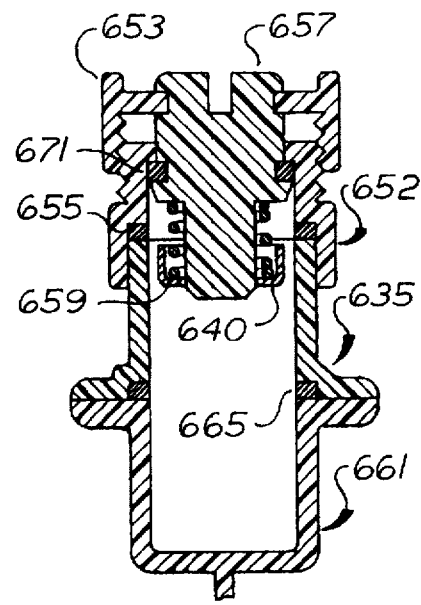
FIG. 7 is a vertical sectional view on an enlarged scale taken along the line 9—9 of FIG. 3.
Figure 8:
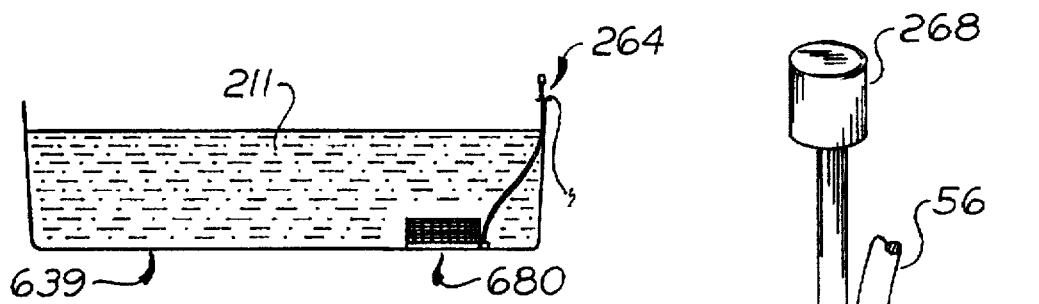
FIG. 8 is a diagrammatic view on a reduced scale of the portable valve shown in FIG. 9 in a typical application.
Figure 9:
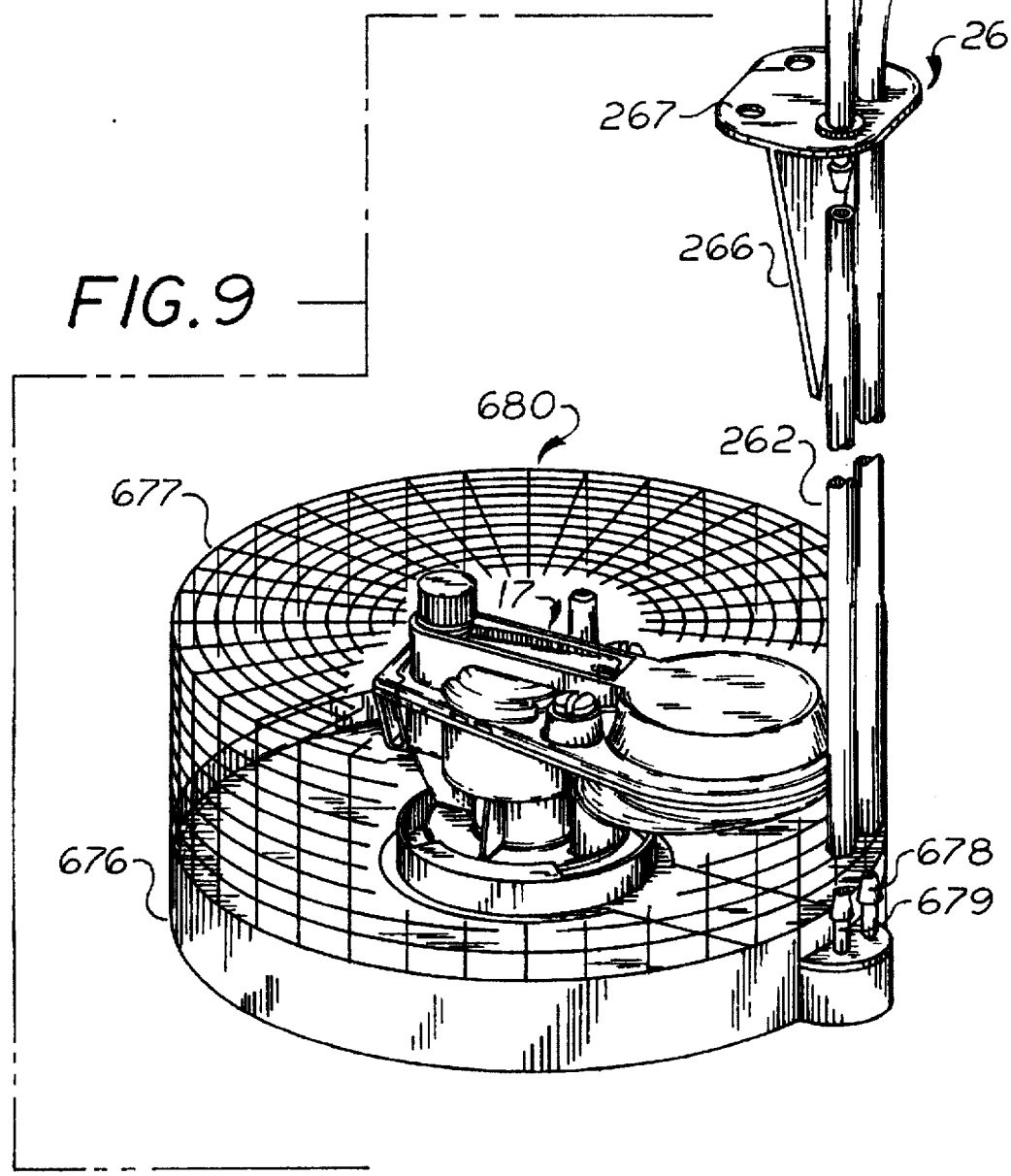
FIG. 9 is a perspective view of the portable valve and its snorkle and water line assembly.

The valve of the present invention shown in FIGS. 1 through 9, is functionally and structurally similar to a valve designed for use in toilets disclosed in U.S. Pat. Nos. 4,240,606, 4,180,096, 4,065,095 and 3,895,645 together with the the parent of this application whose disclosures are incorporated herein by reference.

The physical changes to the valve from U.S. Pat. No. 4,240,606 ("Johnson"), and the other Johnson patents cited above, are illustrated in FIGS. 1 through 7 of this specification The purpose of the reservoir valve 17 is to deliver a controlled flow of liquid to a separate elevated vessel 639 and regulate the level of liquid therein. The Johnson valve cover (Ref. #42 of Johnson) has an open top which allows liquid to enter the chamber above the diaphragm 646 thereby activating the lever 640 and the pilot valve member 644. A disadvantage of the open top is that over extended periods of time and in harsh conditions, foreign matter and debris can enter the chamber above the diaphragm 646 and around the lever 640 and pilot valve member 644, which could block, foul or otherwise limit movement and function of the diaphragm and the lever.

The reservoir fill valve 17 incorporates improvements to the Johnson valve consisting of modifications to the following component parts. (Use Johnson FIG. 9 and our FIGS. 1 through 7 for comparison.) First, the body or main portion of the valve (Johnson Ref. #40) has the following structures of the posterior end of the body as identified by Johnson Reference numbers: 30, 168, 170, 220, 222, 238 removed and replaced with a screw receptacle boss 669 identical to the bosses of the Johnson valve (Johnson Ref. #242) All of the Johnson liquid exit ports on the posterior end of the valve body 660 are sealed The back flow Preventer (Johnson Ref. #260) remains the same and consists of a valve seat insert member 650, elastomeric body 654, outer ring 656 and a perforated disc member 658. The sealed valve diffuser 651 (Johnson Ref. #206) is identical in form and function except for the removal of the two posterior tabs to accommodate insertion into the new valve body 661. The reservoir valve assembly 649 is the same as the Johnson valve (Johnson Ref. #32) except for the addition of a reservoir valve assembly gasket extension 665 which acts as a seal between the reservoir valve body 661 and the reservoir valve cover 635. The reservoir valve cover 635 (Johnson Ref. #42) has the following structures of the posterior end of the cover (as identified by Johnson Reference numbers: 152, 228 and 240) removed and replaced with the reservoir valve rear screw receptacle 667. In addition to the two fasteners (Johnson Ref. #236) there is an additional fastening screw 664 used to secure the posterior end of the reservoir valve cover 635 to the reservoir valve base 661. A sealing gasket 655 is placed on top of the reservoir valve cover 635 to provide a liquid tight seal between the valve cover and the valve crown 652. The valve crown 652 sits on top of the reservoir valve cover 635 and is fastened through the forward crown screw holes 673 and the crown rear screw hole 663. The valve crown 652 accepts from below the reservoir valve adjusting screw 657 and the reservoir valve adjusting spring 659 and the adjusting screw gasket 671. The reservoir valve adjusting screw 657 is positioned in the adjusting screw and liquid channel 670 which doubles as a liquid channel for delivery of liquid to the crown outlet nipple 668. The reservoir valve adjusting screw head 653 snaps onto the reservoir valve adjusting screw 657 and then threads onto the valve crown threads 662. Liquid is ported from the valve through the crown outlet nipple 668 which is a separate fitting that threads into the valve crown 652 and can be replaced in the event of breakage By removing the crown outlet nipple 668 the reservoir valve 17 performs in a like manner to the diaphragm fill valve described in the parent of the present application. By connecting a liquid delivery line 56 to the crown outlet nipple 668 the reservoir valve 17 delivers liquid to an elevated reservoir. The reservoir valve 17 senses the pressure of liquid against the valve diaphragm 646 and opens the reservoir valve assembly 649 when the loss of liquid in the elevated external reservoir 639 reduces the pressure on the diaphragm thereby opening the valve.

The Portable Valve Base

The reservoir valve 17 fits and functions as described above on the portable valve base 676 which when combined with the reservoir valve and connected by the snorkle air line 262 and the liquid delivery line 56, becomes a true portable valve 680 capable of filing and regulating volumes of liquid in many different types of vessels including but not limited to livestock and animal watering troughs, fountains, water storage tanks, ponds, swimming and kiddie pools and aquariums.

The option of replacing the adjusting screw spring 659 with a spring of greater resistance allows the reservoir valve 17 to function in vessels of larger liquid capacity. The portable valve base 676 is in concept and design similar to the basin described in the parent application in that is is absent only the side walls and snorkle assembly of the basin, which functions are replaced by the walls of the vessel within which the portable valve base is placed within and the use of the snorkle air line 262 which replaces the basin snorkle assembly. The addition of ballast of any suitable kind within the cavity on the underside of the portable valve base 676 keeps the portable valve base stable, upright and on the bottom of any vessel within which it is placed.

The portable valve base 676 has a liquid inlet 678 and an ambient air channel 679 created by the ultrasonic or other type of fusing of two pieces which when combined create sealed and isolated air and water channels The external snorkle 264, necessary for operation of the portable valve base 676 and the valve 17 comprises; an external snorkle screen 268 used to prevent blockage of the snorkle by debris and a support stake 266 which retains the liquid delivery line 56 and the snorkle air line 262 and can be attached to surfaces using the support stake mail/screw holes 267 or pushed into dirt or other media with the pointed end of the stake. The portable valve cage 677 connects to the portable valve base 676 and helps protect the reservoir valve 17 from external damage such as that caused by livestock. Particularly in the case of livestock waterers or other applications where the portable valve base 676 and the reservoir valve 17 are exposed to potential damage, the user can also armour the liquid delivery line 56 and snorkle air line 262 in any matter dictated by circumstances, for example; installing the lines in rigid conduit of any appropriate material or plumbing very close to the portable valve base 676 with rigid pipe connected to the portable valve base with short lengths of liquid delivery line 56.

List of Reference numbers
17 Reservoir valve
56 Liquid delivery line
100 Valve base
108 Valve base compression cam extension
211 Liquid
262 Snorkle air line receptacle
264 External snorkle
266 Support stake
267 Support stake nail/screw holes
268 External snorkle screen
635 Reservoir valve cover
639 External reservoir 640 Lever
644 Pilot valve member
645 Pre-set clip valve grip
646 Diaphragm
649 Reservoir valve assembly
650 Insert member
651 Reservoir valve diffuser
652 Valve crown
653 Reservoir valve adjusting screw head
654 Elastomeric body
655 Sealing gasket
656 Outer ring
657 Reservoir valve adjusting screw
658 Perforated disc member
659 Reservoir valve adjusting spring
661 Reservoir valve body
662 Valve crown threads
663 Crown rear screw hole
664 Fastening screw
665 Reservoir valve assembly gasket
667 Reservoir valve rear screw
668 Crown outlet nipple
669 Screw receptacle boss
670 Adjusting screw & water channel
671 Adjusting screw gasket
673 Forward crown screw holes
676 Portable valve base
677 Portable valve cage
678 Portable valve water inlet
679 Portable valve air channel
680 Portable valve assembled

We claim:

1. An adjustable reservoir fill valve adapted for communication by conduit with a separate water reservoir displaced above the valve, which valve comprises:

(i) a reservoir valve crown held in liquid tight combination with the reservoir valve cover;

(ii) an interior cavity with a lower portion adapted for liquid communication with a source thereof under pressure and an upper portion adapted for liquid communication with the reservoir;

(iii) a second interior cavity which houses a diaphragm which reciprocally closes the valve, in response to the weight of liquid in the the reservoir above the diaphragm when the liquid is at the selected liquid level, add opens the valve in response to a drop in the level of the liquid in the reservoir below the selected liquid level;

(iv) a liquid inlet port adapted for liquid communication with the liquid inlet of the reservoir and the lower portion of the valve interior cavity;

(v) a single liquid outlet port adapted for providing liquid communication between the upper portion of the valve cavity and the elevated reservoir for dispensing liquid from the fill valve into the reservoir when the valve is in its open position;

(vi) a gas port providing gas communication between the diaphragm cavity and the exterior of the reservoir for maintaining the diaphragm of the fill valve at ambient pressure;

(vii) a reservoir valve assembly which is sealed with an integral gasket that closes and seals the interior cavity of the valve;

(viii) a detachable reservoir valve crown that fits in liquid tight communication onto and around the open top of the reservoir valve cover, thereby preventing liquid from leaving the valve in any but the single outlet port located on the top of the valve crown;

(viiii) a sealed liquid tight valve adjusting screw that fits through the valve crown and incorporates a sealing gasket around its shank to prevent liquid leakage from the valve, and (x) a sealing gasket to seal the space between the valve crown and the reservoir valve cover.

2. An adjustable reservoir fill valve of claim 1, in combination with a valve mounting base adapted for mounting the fill valve thereon, for supplying liquid thereto under pressure and for maintains the underside of the valve diaphragm at ambient pressure when the fill valve is mounted thereon, which valve mounting base comprises;

(i) a liquid inlet port adapted to connect the valve mounting base to a source of the liquid under pressure;

(ii) seating means on the upper surface thereof for detachably mounting the fill valve thereon;

(iii) a gas inlet/outlet port adapted to connect the underside of the valve diaphragm to ambient pressure gas;

(iv) a cavity therein suitable for holding ballast material, and (v) a liquid permeable cover adapted to cover and protect the fill valve when the fill valve is mounted on the valve mounting base.

* * * * *